United States Patent Office 3,412,971
Patented Nov. 26, 1968

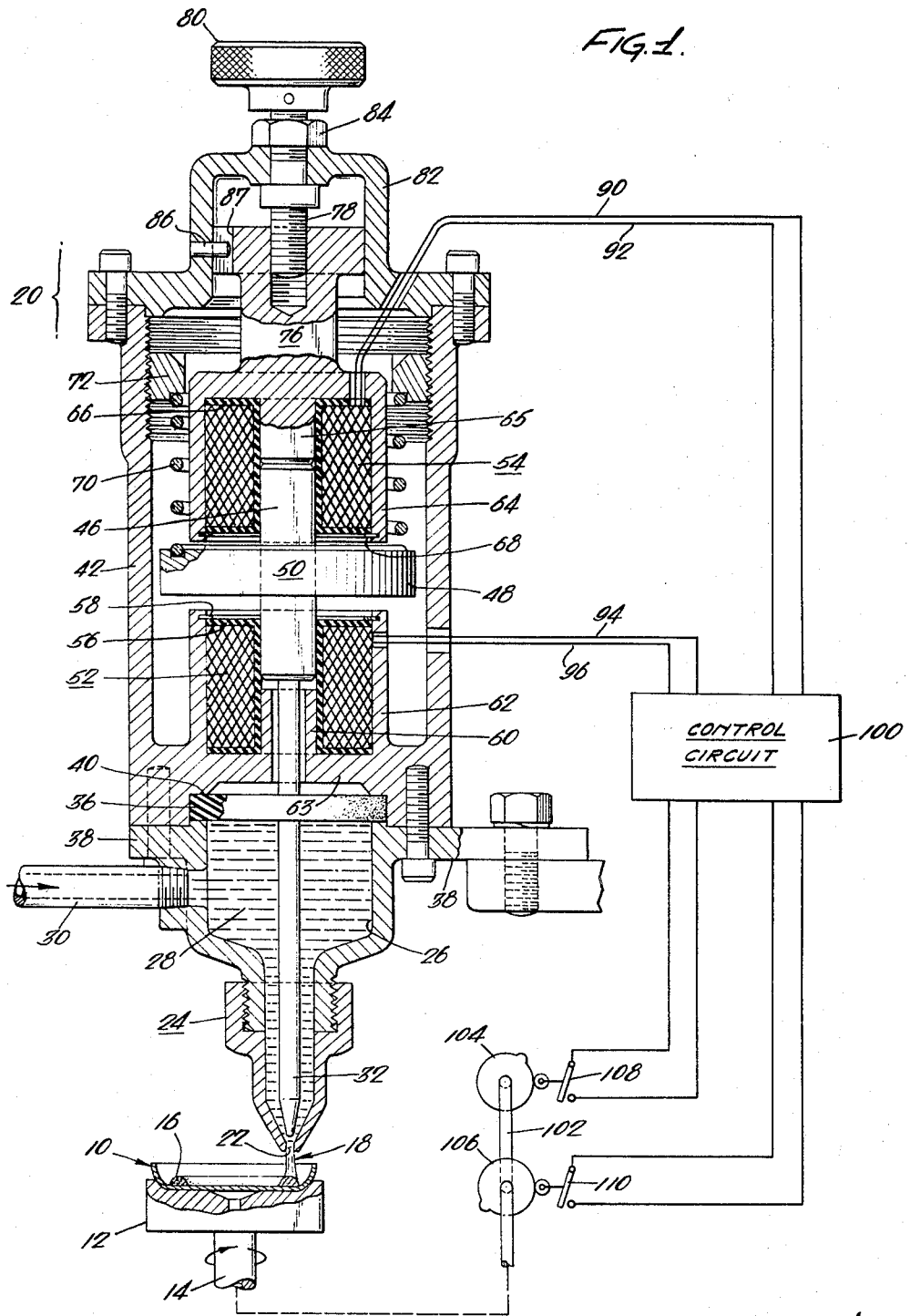

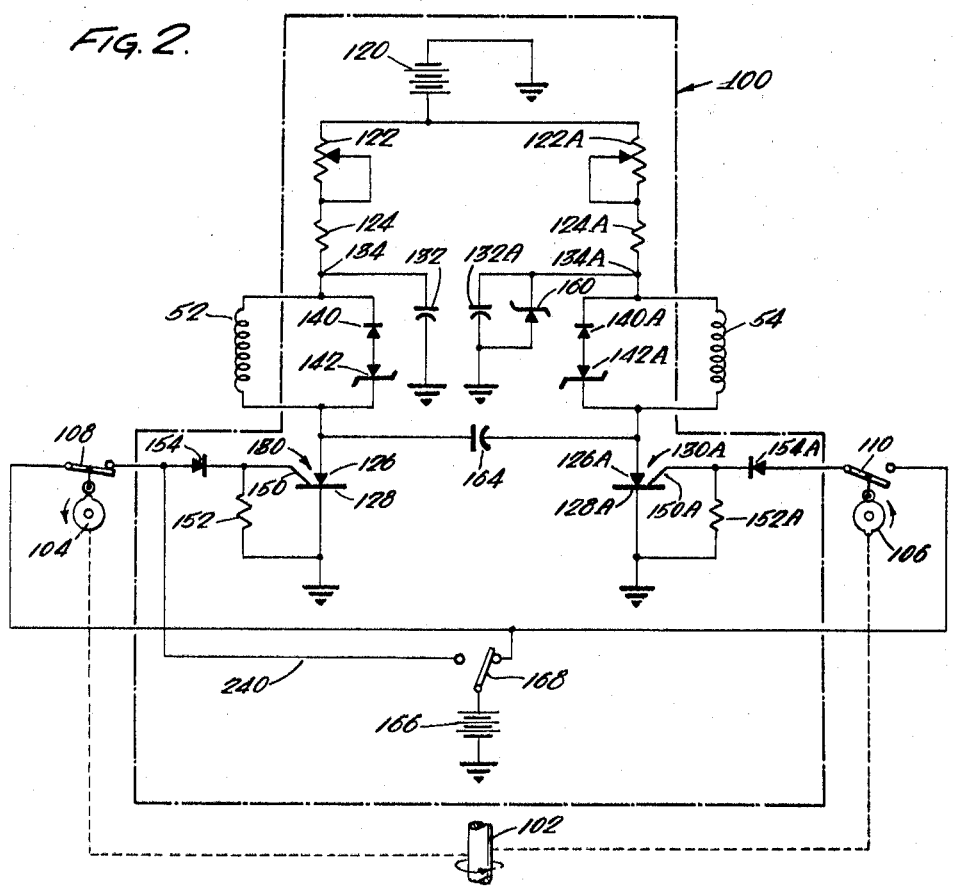
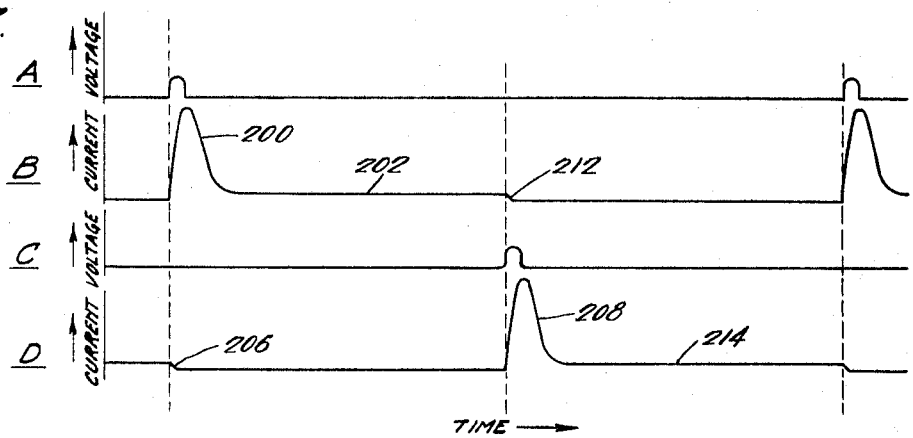
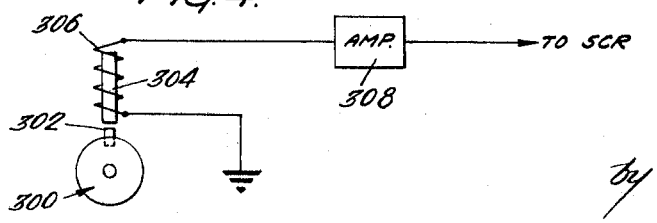

3,412,971
ELECTRICALLY-CONTROLLED VALVE APPARATUS AND CONTROL CIRCUIT SUITABLE FOR USE THEREIN
David T. McDivitt, Lancaster, Pa., assignor to Armstrong Cork Company, Lancaster, Pa., a corporation of Pennsylvania
Filed Mar. 3, 1966, Ser. No. 531,605
15 Claims. (Cl. 251—137)

ABSTRACT OF THE DISCLOSURE

An electrically-controlled metering valve for dispensing viscous plastic to form a sealing ring around the underside of bottle caps, accurately and at a high rate of speed. A pair of solenoid coils are disposed around the valve stem and actuated alternately to open and close the valve. Each coil is actuated by an SCR having a capacity-discharge circuit associated with it to provide rapid valve operation without the need for high average electrical power and associated excessive heating, and capacitive cross-coupling between the SCR's synchronizes their operation. The desired rapid "snap action" of the valve is enhanced by a rectifier and Zener diode circuit in parallel with each coil.

---

This invention relates to electrically-operable valve apparatus and to electrical control circuits suitable for operating a valve between two positions thereof. In its preferred form the invention relates to valve apparatus suitable for automatically dispensing viscous liquids.

There are many applications in which it is desirable to operate a valve rapidly and with accurate timing, and often it is desirable to operate it automatically and in predetermined accurately-timed relationship to other related operations. In some applications it is necessary so to operate the valve despite substantial resistance to valve operation, and despite substantial variations in such resistance which may be occasioned by differences or changes in the viscosity of the fluid whose flow is controlled by the valve.

In an important class of applications of the invention with particular relation to which the invention will be described hereinafter in detail, it is desired to dspense a highly-viscous liquid onto a workpiece during predetermined time-spaced intervals. For example, it is known to form resilient sealing rings on closure members such as bottle caps by dispensing a narrow stream of highly-viscous liquid plastic from a nozzle onto each closure as it is rotated eccentrically with respect to the nozzle through one revolution, after which the dispensed liquid is caused to set to form an adherent, resilient sealing ring. To accomplish this the dispensing of the viscous liquid is controlled by supplying it to the nozzle by way of a valve which is turned on to initiate laying-down of the sealing ring and turned off when the ring is just completed. If there is any appreciable error in the angular position of the closure for which dispensing is started or stopped, the resultant sealing ring will be imperfect. Thus if dispensing is started too soon or arrested too late, there will be an overlap producing a raised region on the ring, while if the dispensing is started too late or arrested too soon there will be a gap or depression in the final ring.

The avoidance of such starting and stopping errors is relatively easy if the workpiece is moved slowly during dispensing, but where the workpiece is moved at high speeds the timing of starting and stopping of the dispensing becomes highly critical. For example, economical mass-production of bottle caps may require that each sealing ring be laid down during a single cap revolution which takes place in about one-tenth of a second. In such case errors of even a millisecond in the timing of the operation of the dispensing valve become significant in producing harmful defects in the ring.

Furthermore, it is often necessary to accomplish accurate dispensing of the liquid against considerable resistance to valve motion occasioned by the high viscosity of the liquid dispensed, and it is often important also to preserve accuracy of timing despite changes in viscosity of the liquid which are particularly prevalent with certain types of liquids.

Various types of mechanical, pneumatic and electromechanical apparatus have been used in the prior art to operate valves. Entirely mechanical valve controls are not sufficiently rapid in action or accurate in timing for many purposes, particularly after repeated use with resultant wear; pneumatic apparatus is inconvenient in requiring a controlled supply of air pressure, and also generally involves use of mechanical couplings, bearings and the like which introduce timing errors. Both mechanical and pneumatic control systems also generally involve lubrication and other maintenance problems which require interruption of normal operation. Solenoid valves operated by appropriate electrical circuitry avoid certain of these difficulties, but leave the problem of how to control the solenoids so as to obtain the requisite very rapid, highly accurate and reliable operation necessary in certain applications such as the high-speed production of sealing rings for closures referred to hereinbefore.

For example, to operate a valve between its two extreme positions with high speed and accurate timing, even against the substantial and sometimes variable viscosity of the liquid whose flow is to be controlled, might suggest the brute-force application of very high power to the solenoids. However such high powers result in substantial heating of the solenoids and nearby apparatus, and in many cases such heating cannot be tolerated. For example, if the liquid to be dispensed is a thermosetting resinous material, even small rises in the temperature of the liquid will have a serious adverse effect on the properties of the liquid. On the other hand, if small amounts of power are used to drive the solenoids it would be expected that the valve operation would be slower and more sensitive to changes in viscosity of the liquid. At very high rates of operation there are also serious problems relating to the timing of actuation and deactuation of the solenoids, and to assuring reliable operation over long periods of continuous operation.

These and similar problems arise in connection with other types of electrically-controlled valve apparatus to which the invention is applicable.

Accordingly, it is an object of the invention to provide new and useful electrically-controlled valve apparatus.

Another object is to provide such apparatus which is capable of producing rapid and accurately-timed operation of a valve.

Another object is to provide such apparatus which requires only a relatively small amount of electrical supply energy, and generates only relatively small amounts of heat in the vicinity of the valve.

Another object is to provide such apparatus which is effective to control accurately the dispensing of highly viscous liquids, and of such liquids having viscosities which vary from time to time.

A further object is to provide such apparatus which is simple, compact, reliable and substantially free from maintenance problems over long periods of usage.

Another object is to provide valve apparatus for the rapid, accurate, intermittent dispensing of a highly viscous liquid suitable for use in forming a sealing ring on a closure member such as a bottle cap.

It is also an object to provide a new and useful electrical control circuit for the intermittent actuation of one or more armature-actuating coil members.

In accordance with the invention these and other objects are achieved by the provision of a novel electrical circuit for operating one or more armature-actuating coil members, and a novel electrically-controlled valve apparatus including one or more coil members and a novel electrical circuit for operating a valve between its open and closed conditions. In a preferred form of the invention two coil members are operated alternately to open and close a valve for the dispensing of fluids, particularly highly-viscous liquids.

The control circuit of the invention comprises as a part thereof a bistable device, preferably a semiconductor bistable device, having a first and a second electrode and control means for actuating said device to its high-conduction state in which a relatively large current will flow between said first and second electrodes when a voltage of a predetermined polarity is applied between them. The device also has the inherent characteristic of then returning to its low-conduction state when the current flowing between said first and second electrodes falls below a predetermined level. A particularly advantageous form of such bistable device for use in the invention is that known as a silicon controlled rectifier, hereinafter designated SCR, in which the anode and cathode elements constitute said first and second electrodes, respectively, and the gate element of the SCR constitutes said control means.

In accordance with the invention, the first and second electrodes of the bistable device are connected in common series circuit with a source of direct current and a coil member, the coil member being disposed adjacent an armature on which the coil member exerts a magnetic force when current passes through the coil member. When the bistable device is in its low-conduction state, little or no current passes through the coil member, but when a timing control signal is applied to the control means of the bistable device the latter device is switched to its high-conduction state and a current flow through the coil member so that a magnetic force is exerted on the armature to move it to a different position. Further in accordance with the invention there are employed capacitive means connected to a direct-current source so as to be charged while said bistable device is in its low-conduction state, and connected to the coil member so as to be discharged through the coil member when the bistable device is switched to its high-conduction state. Preferably this is accomplished by connecting the capacitive means in shunt with the series combination of the coil member and the first and second electrodes of the bistable device, and by connecting resistive means between one terminal of said capacitive means and one terminal of said direct-current source. The resultant strong capacitor-discharge current pulse through the coil member produces a strong initial force on the armature to cause it to move quickly away from its initial position and to its new position; when the capacitor-discharge pulse is ended, the current falls to a lower level sufficient to maintain the armature positively in its new position, so long as said bistable device remains in its high-conduction state. Means are additionally provided to reduce the current through the first and second electrodes of the bistable device below the predetermined level for which it reverts to its low-conduction state when it is desired to release the armature from the effects of the coil member. Preferably the latter means for turning off the bistable device comprises capacitive means connected between the circuit described above and another circuit like it, in which the coil member referred to above is replaced by a second coil member disposed and arranged so that current through it tends to move said armature in a direction opposite to that described above. The arrangement is such that the turning-on of the bistable device in the other similar circuit acts through the interconnecting capacitive means to turn off the first-described bistable device, and vice versa.

Accordingly, by applying a control signal to the control means of one of the bistable devices the armature is moved rapidly to one of its extreme positions in response to the strong capacitor-discharge pulse described above, is held there by the following smaller-valued current, and, when a control signal is applied to the control means of the other bistable device, the current through the first coil member is discontinued and a strong capacitor-discharge current produced in the other coil member to return the armature rapidly to its other extreme position, where it is held by a smaller current until the latter current is terminated by the next turning-on of the first bistable device.

With this arrangement, the armature is moved rapidly between its extreme positions because of the strong capacity-discharge pulses through the coil members, but because the pulses persist for only a small fraction of the time the average power applied to the coil members is small, and the heating of the coil members correspondingly small. In addition, the above-described action of the interconnecting capacitive means automatically provides the desired accurately-timed discontinuance of current through each coil member when the other is first supplied with current, without any additional mechanical or other form of switch.

In the preferred form of the invention the two coil members are disposed around different portions of the same armature, to which armature is connected the stem of a needle valve through which a viscous fluid is dispensed when the valve is open. The arrangement of the invention permits the dispensing valve to be opened and closed at the very high rates and with the high accuracy of timing required in applications such as the high-speed forming of sealing rings on bottle caps, for example.

It has also been found, further in accordance with a preferred form of the invention, that the desired rapid "snap action" of the armature in moving between its opposite extreme positions is enhanced by placing in parallel with each of the coil members the series combination of a diode rectifier and a Zener diode which are so poled that the diode rectifier is biased in its reverse direction and the Zener diode in its forward direction in response to the steady-state voltage applied from the source of direct voltage. The diode rectifier and Zener diode remain nonconductive except immediately after the shutting-off of current through the associated coil member, at which time a strong inductive "kick back" voltage of polarity opposite to that normally applied across the coil member is produced. When the "kick back" voltage rises above the breakdown voltage of the Zener diode, the Zener diode and the diode rectifier both conduct strongly and control the decay of magnetic flux produced by the coil member in such manner as to accentuate the "snap action" of the armature.

The control signals for operating the control means of the two bistable devices may be provided by cam-actuated switches driven by the shaft which rotates the workpiece onto which the liquid is dispensed, or by magnetic pick-up means operated in response to the motion of the workpiece-supporting shaft but without mechanical connection thereto.

Other objects and features of the invention will be more readily comprehended from a consideration of the following detailed description, taken in connection with the accompanying drawings, in which:

FIGURE 1 is a diagrammatic view, partly in section, illustrating a typical application of the invention to the forming of sealing rings on closures;

FIGURE 2 is an electrical schematic diagram showing the details of a preferred embodiment of a control circuit suitable for use in th system shown in FIGURE 1;

FIGURE 3 is a set of four graphical representations shown at A, B, C and D and plotted to a common time axis, to which reference will be made in explaining the operation of the invention; and FIGURE 4 is a diagrammatic representation showing an alternative arrangement for a part of the system represented in FIGURES 1 and 2.

Referring now particularly to FIGURE 1 of the drawings, there is shown a system for laying down sealing rings on closure members such as the bottle cap 10. Cap 10 is held in a suitable vacuum chuck 12 which is rotatable by shaft 14 about a vertical axis by any appropriate means (not shown). It will be understood that cap 10 is one of a series of such caps which are automatically and rapidly placed into chuck 12 and automatically removed therefrom when the sealing ring has been applied thereto.

A partially completed sealing ring 16 is shown in the drawings to illustrate the manner of forming such rings on the caps by ejecting a suitable highly-viscous resinous material downwardly along the path 18 onto a region of the cap displaced by a predetermined radius from the axis of rotation of shaft 14.

The viscous liquid for forming rings 16 is dispensed from a dispensing gun 20 by way of an outlet aperture 22 in a nozzle 24. The gun 20 is of generally upright tubular form and includes a chamber 26 in which the viscous liquid 28 is maintained under pressure by means of a pressurized liquid inlet line 30 which supplies the resinous liquid from a suitable pressurized source (not shown) to the chamber 26. The dispensing of the liquid 28 through outlet aperture 22 is controlled by the upward and downward motion of a valve stem 32, the lower end of which is tapered to fit snugly against the sides of the outlet aperture 22 when the valve stem 32 is in its most downward position, thereby preventing dispensing of liquid, and which, when raised momentarily, permits the desired escape of the liquid to form the sealing ring such as 16, after which the stem is again lowered to cut off the flow of liquid.

The liquid chamber 26 is closed at its top by a resilient diaphragm member 36 which is clamped between a flange 38 integral with the walls of the chamber 26 and a shoulder 40 on the main body member 42 of dispensing gun 20. Valve stem 32 passes axially through, and is secured in any appropriate manner to, the center of diaphragm member 36, diaphragm member 36 therefore providing the desired sealing-off of liquid chamber 26 from the upper portion of gun 20 while at the same time permitting limited upward and downward motion of valve stem 32.

The uppermost portion of the valve stem 32 is secured to an armature rod 46 which extends coaxially with valve stem 32 but is somewhat larger in diameter; a transversely-extending armature plate 48 surrounds and is secured to armature rod 46 near the middle of its vertical length. Both armature rod 46 and armature plate 48 are of a magnetic material and act together as a composite magnetic armature 50 for moving valve stem 32 up and down to open and close the valve.

The composite armature 50 in turn is acted upon magnetically to be moved up and down by a first coil member 52 and a second coil member 54. Coil member 52 is wound on a suitable spool 56, surrounds the lower end of armature rod 46, and is located in an annular recess formed by an inner annular wall member 60 and an outer annular member 62 which are integral with the lower base portion 63 of the main body member 42 of gun 20. Main body member 42 and the wall members 60 and 62 integral therewith are composed of a magnetic material. Coil member 52 is secured in position at its top by means of a retaining washer 58 secured in a slot in the inner side surface of wall member 62. Coil member 54 surrounds the portion of armature rod 46 on the upper side of armature plate 48, is positioned in an annular recess formed by an outer annular wall member 64 and an inner axial downwardly-projecting boss 65, and is wound on a spool member 66 and held in position by a retaining washer 68 secured in a slot in the inner side surface of wall member 64.

The lower end of a light compression spring 70 engages the upper surface of armature plate 48 and is constrained at its upper end by a retaining ring 72 which is supported by threads in the inner surface of main body member 42. Spring 70 serves to hold the valve stem 32 in its downward-most position when no electrical power is applied to either of the coil members, thereby to hold the valve in its closed position under such conditions despite the tendency for the pressurized liquid in chamber 26 to deflect diaphragm 36 upwardly and thereby produce opening of the valve.

Wall member 64 and boss 65 are integral downward extensions of a coil-supporting body 76 of magnetic material which depends from a screw member 78 in threaded engagement with body 76, by means of which the vertical position of body 76 can be adjusted by turning of knob 80. This permits adjustment of the stroke of the valve stem 32 to control the amount of liquid dispensed. Screw 78 is rotatably mounted in the upper surface of a cap 82 secured to main body member 42. An appropriate clamp nut 84 is provided to fix the position of screw 78 after it has been set in its desired position. A pin 86 extending from the sidewall of cap 82 into a vertical slot 87 in body 76 prevents the body 76 from rotating during adjustment of its longitudinal position by means of screw 78. A pair of leads 90 and 92 and another pair of leads 94 and 96 extend from coil members 54 and 52, respectively, to a control circuit 100.

Also provided is a cam shaft 102 mechanically coupled to shaft 14 and on which are mounted a pair of eccentric switch-actuating cams 104 and 106 for opening and closing single-pole, single-throw switches 108 and 110, respectively. Both terminals of each of switches 108 and 110 are separately connected to control circuit 100. The control circuit 100 responds to momentary closing of switch 108 to initiate a current through coil member 52, which current produces a downward, attracting force on composite armature 50 to move valve stem 32 to its closed position and hold it there. The control circuit also responds to closing of switch 110 to terminate the current in coil member 52 and to initiate current in coil member 54, the latter current serving to raise the composite armature 50 into abutment with the lower side of boss 65 and to hold it there until switch 108 closes again to terminate the current through coil 54 and snap the armature 50 back to its lower position for which the valve is closed.

FIGURE 2 shows within the dashed outline the details of control circuit 100 for operating the coil members 52 and 54 in response to momentary closing of cam-actuated switches 108 and 110 alternately and in synchronism with rotation of the cam shaft 102. In this circuit the coil member 52 is connected in common series circuit with a source of direct voltage 120, a variable resistor 122, a fixed resistor 124, and the anode and cathode electrodes 126 and 128, respectively, of silicon controlled rectifier 130 (SCR). The capacitor 132 is connected from the interconnection 134 between resistor 124 and coil member 52 to a reference potential designated as ground, to which the negative side of the direct voltage source 120 and the cathode of SCR 130 are also returned. The polarity of the source 120 is such as to make the anode 126 of SCR 130 normally positive with respect to its cathode 128. In parallel with coil member 52 is connected the series combination of a diode rectifier 140 and a Zener diode 142. The diode rectifier 140 and the Zener diode 142 are poled so that their anodes are connected directly together. The gate element 150 of SCR 130 is returned to ground through a suitable leak resistor 152 and is also connected to the cathode element of semiconductor diode 154, resistor 152 and diode 154 constituting conventional gate input circuits for an SCR.

Another series circuit arrangement substantially the same as that thus far described in connected between the positive supply terminal of source 120 and ground, and corresponding parts of this second circuit will be indicated by the same numerals applied to the corresponding parts in the first circuit with the suffix A applied thereto. Thus there is connected in series between the positive terminal of source 120 and ground a variable resistor 122A, a fixed resistor 124A, the coil member 54, and the anode and cathode elements 126A and 128A, respectively, of SCR 130A. The capacitor 132A is connected between ground and the interconnection 134A of resistor 124A and coil member 54. A diode rectifier 140A and a Zener diode 142A are connected across coil member 54 in the same manner as the corresponding elements are connected across coil member 52. The gate element 150A of SCR 130A is connected through a leak resistor 152A to ground and is also connected to the cathode of a diode rectifier 154A, in conventional manner for operating the gate of an SCR. Although not essential to the operation of the invention, in the embodiment shown in FIGURE 2 a Zener diode 160 is also connected in parallel with capacitor 132A with its anode grounded, for reasons which will be discussed hereinafter.

Also employed is a capacitor 164 which interconnects the anode electrodes 126 and 126A of SCR 130 and SCR 130A. The switch arms of cam-operated switches 108 and 110 are supplied with positive potential from a direct voltage source 166 by way of manually-operable single-pole, double-throw switch 168 when the latter switch is in the position shown.

Describing now the operation of the circuit, it will be assumed that a bottle cap such as 10 in FIGURE 1 has just been placed in the chuck 12 and the outlet aperture of dispensing gun 20 is closed. As will become apparent hereinafter, at this stage of the operation the SCR 130 is in its high-conduction state and therefore presents a relatively low resistance between its anode and cathode electrodes 126 and 128, thereby causing the coil member 52 to hold the armature 50 of FIGURE 1 in its downward or closed position in response to current flowing from source 120 through variable resistor 122, fixed resistor 124, coil member 52 and the anode and cathode electrodes 126 and 128 of SCR 130. Now when chuck 12 begins to rotate, cam shaft 102 turns cam 106 to close switch 110 momentarily, thereby applying to the anode of gate diode 154A a positive pulse which passes through the diode to the gate electrode 150A of SCR 130A. Prior to this time SCR 130A has been in its low-conduction state, but the pulse thus applied to its gate electrode switches it to its high-conduction state. The timing of such a control pulse is illustrated at A of FIGURE 3. It will be understood that all of the waveforms in FIGURE 3 are for illustrative purposes only and are not intended to represent the exact waveforms existing in an actual practical circuit.

Prior to this turning-on of SCR 130A, the capacitor 132A has been charged by the supply 120 by way of variable resistor 122A and fixed resistor 124A. When SCR 130A is first switched on as described above, a discharge path is thereby provided for capacitor 132A by way of coil member 54 and the anode and cathode elements 126A and 128A of SCR 130A. The resultant capacitor discharge results in a momentary high-intensity current pulse through coil member 54, as represented at 200 of FIGURE 3B. This strong current pulse applies a rapidly-increasing, upwardly-directed force on armature 50 to move it rapidly to its uppermost position. The large pulse of current produce when SCR 130A is first turned on causes the anode 126A of SCR 130A to go strongly negative momentarily, thereby causing a momentary current flow to the left-hand plate of interconnecting capacitor 164, which current is effectively subtracted from that normally flowing to anode 126 of SCR 130, thereby reducing the latter current below the predetermined level for which SCR 130 reverts to its low-conduction state, thereby terminating the flow of current through coil member 52, as shown at 206 of FIGURE 3D, just as intense current is building up in the other coil member 54.

When capacitor 132A has been thus discharged, a lower level of current, indicated at 202 in FIGURE 3B, continues to be applied to coil member 54 through variable resistor 122A, fixed resistor 124A and anode and cathode electrodes 126A and 128A, this lower current, which may be referred to as the "holding current," being sufficient to hold armature 50 in its uppermost position. In this way the valve is rapidly opened to permit the start of the laying-down of the sealing ring 16 and held open until formation of the ring is complete.

The valve aperture 22 remains open as the chuck 12 is rotated, until cam shaft 102 reaches the position for which switch 108 is momentarily closed to apply a voltage pulse by way of diode rectifier 154 to gate element 150 of SCR 130, the timing of the control pulse thus applied being represented at C of FIGURE 3. During the immediately-preceding interval in which SCR 130 is in its low-conduction or off state, the capacitor 132 has charged toward the positive supply potential by way of variable resistor 122 and fixed resistor 124, so that, when SCR 130 is turned on by the gate pulse shown at C of FIGURE 3, capacitor 132 discharges through coil member 52 and the anode and cathode electrodes 126 and 128 of SCR 130 to produce the high-intensity pulse of current through coil member 52 shown at 208 of FIGURE 3D. This applies a strong, immediate, downward force on armature 50 in the direction to close the valve, and at the same time immediately cuts off SCR 130A through the coupling provided between anodes 126 and 126A of the two SCR's by the interconnecting capacitor 164, in a manner which will be apparent from the foregoing description of the turning-off of SCR 130. This turning off of SCR 130A is represented at 212 of FIGURE 3B. The resultant rapid closing of the valve immediately terminates the dispensing of viscous fluid at the proper time to form a perfect sealing ring on cap 10. After the occurrence of the capacitor-discharge pulse of current 208 through coil member 52, the latter current falls to the holding level shown at 214 of FIGURE 3D, produced in response to the application of the voltage from source 120 to the series combination of variable resistor 122, fixed resistor 124, coil member 52 and anode and cathode electrodes 126 and 128 of SCR 130. The latter holding current holds the valve closed while the cap 10 is automatically removed and replaced with a new cap, and the cycle described above automatically repeats itself.

The circuits in parallel with coil members 52 and 54, provided in one case by diode rectifier 140 and Zener diode 142 and in the other case by diode rectifier 140A and Zener diode 142A, are normally non-conductive in response to the steady-state voltage from source 120 since the latter voltage is of the polarity for which the diodes 140 and 140A are blocked. However, each time in the course of the above-described operation at which current through either coil member 52 or coil member 54 is arrested by the shutting off of its associated SCR, there is a momentary strong reversal of polarity of the voltage across the corresponding coil member due to the phenomenon often referred to as "inductive kickback." The resultant reverse-polarity voltage rapidly rises above the level for which the Zener diode 142 or 142A breaks down to permit substantial short-circuiting of the associated coil member. This action not only serves to protect the SCR's from damage which might otherwise result from such rapid, excessive, negative swings of the anode voltages thereof, but when used in connection with a dispensing gun of the type shown in FIGURE 1, has been found to exert a controlling effect on the demagnetization of that coil and its surrounding magnetic material the current to which is being shut off. This has been found to enhance the rapid and accurately-timed "snap action" with which the armature 50 moves between its two extreme positions in opening and closing the valve at the exact desired times.

The purpose of Zener diode 160 and connection 240 between switch 168 and the anode of diode 154 is as follows. When switch 168 is manually thrown to its left-hand position to remove voltage from both switches 108 and 110 and thus halt the normal repetitive opening and closing of the valve, a steady positive voltage is applied by way of switch 168 and connection 240 to gate 150 of SCR 130 to hold it constantly in conduction, thereby holding the valve closed and also keeping capacitor 132 discharged. However, under these conditions capacitor 132A is no longer being intermittently discharged and therefore tends to charge to the full voltage of source 120, which may be above the maximum safe operating voltage for the anode of SCR 130A. Zener diode 160 connected across capacitor 132A has a breakdown voltage substantially lower than the maximum safe operating voltage for the anode of SCR 130A but greater than that developed across capacitor 132A when it is being intermittently discharged during normal operation, and therefore prevents possible damage to SCR 130A.

The adjustments of variable resistors 122 and 122A and the values for fixed resistors 124 and 124A, taken together with the values of the capacitors 132 and 132A, are such as to insure that each of the capacitors 132 and 132A will charge sufficiently during the interval in which its corresponding SCR is turned off, and such that the "holding" current flowing through the resistors is as small as possible compatible with positive holding of the armature in its desired position. By this choice of circuit values, the peak current pulse used to produce rapid switching of the valve between its open and its closed positions may be many times greater than the holding current, and since the durations of the high-intensity current pulses are relatively brief, the average electrical power to the coils and the resultant heating thereof is relatively low.

In a typical embodiment in which the invention is applied to the laying-down of rings of a highly viscous liquid plastic material to form a sealing ring in about one-tenth second with intervening intervals of about one-tenth second duration during which the closures are removed and replaced, some examples of specific values which may be utilized in the circuit of FIGURE 2 will now be given without intending in any way to limit the scope of the invention. Variable resistors 122 and 122A may have resistances variable between 0 and 1,000 ohms, resistors 124 and 124A may each have values of 1,500 ohms, capacitors 132 and 132A may each have capacitances of 150 microfarads, capacitor 164 may have a value of one microfarad, and resistors 152 and 152A may each have a value of about 1,000 ohms, in which case the voltage from supply source 120 may be 300 volts DC. The Zener diodes 142 and 142A may have breakdown voltages of about 24 volts. With such values in one specific embodiment the capacity-discharge pulses had peak values of about 3 amperes and durations of about 10 milliseconds, the holding currents were about 0.2 ampere, the valve open for about 0.1 second and closed for the same length of time. Timing accuracy of less than a half millisecond was obtained.

FIGURE 4 illustrates an alternative construction which may be substituted for the cam-actuated switch arrangements 104, 108 and 106, 110 in FIGURE 2. Either or both of cams 104 and 106 may be replaced by a wheel 300 having on its periphery a protruding rod 302 of magnetic material, the wheel being rotated in synchronism with chuck 12 so that rod 302 rotates past the end of magnet 304 each time it is desired to provide a control pulse to the gate electrode of a particular one of the SCR's. A coil 306 is wound around the magnet 304, one end of the coil being grounded and the other connected to a suitable amplifier 308 the output of which is applied to the electrode of the SCR to be controlled. The motion of rod 302 past the end of magnet 304 induces an electrical pulse in winding 306 which is amplified in amplifier 308 and applied to the SCR gate electrode to turn on the SCR. With this arrangement a system is provided which employs no mechanically-contacting moving parts, and hence is characterized by an especially long life while retaining extremely high timing accuracy.

The control circuit 100 may be used to supply currents to armature-actuating coils for purposes quite different from those specifically described above, and in some cases only one SCR control circuit may be used to provide armature movement in one direction only, some other known arrangement being used to move it in the opposite direction.

Thus while the invention has been described with particular reference to specific embodiments thereof in the interest of complete definiteness, it will be understood that it may be embodied in a variety of other diverse forms differing substantially from those specifically shown and described without departing from the scope and spirit of the invention as defined by the appended claims.

What is claimed is:

1. A control circuit suitable for operating an armature back and forth between a first position and a second position thereof, comprising:
   first means operative when actuated to move said armature from said first position to said second position thereof;
   second means operative when actuated to return said armature from said second position to said first position; and
   means for actuating said first means and said second means alternately to cause said armature to move back and forth between said first and second positions;
   said first means comprising a coil member responsive to a current therein to move said armature from said first position to said second position, a source of direct voltage, a bistable device, and means connecting said coil member, said source, and said bistable device in common series circuit with each other, said bistable device being actuatable between a stable low-conduction state and a stable high-conduction state thereof, whereby when said bistable device is actuated to said high-conduction state said source produces said current in said coil member for moving said armature from said first position to said second position;
   said first means also comprising capacitive means connected in parallel with said coil member and with said bistable device and means for charging said capacitive means when said bistable device is in said low-conduction state thereby to increase the current initially flowing in said coil member each time said bistable device is actuated to said high-conduction state.

2. The circuit of claim 1, in which said bistable device is a semiconductor device and said actuating means comprises means responsive to actuation of said second means for deactuating said first means.

3. The circuit of claim 1, comprising resistive means in series in said common series circuit and having a resistance value which is small enough to maintain said current through said coil member at a value sufficient to hold said armature in said second position until said bistable device is actuated to said low-conduction state thereof, and also comprising the series combination of a diode rectifier and a Zener diode connected in parallel with said coil member, said diode rectifier and said Zener diode having like elements thereof directly connected together and being so poled as to reverse-bias said rectifier in response to the steady-state voltage produced by said source.

4. The circuit of claim 3, comprising a second Zener diode connected in parallel with said capacitive means and poled so as to be normally non-conductive and to be rendered conductive in response to increases of the voltage across said capacitive means above a predetermined level.

5. A circuit suitable for operating an armature back and forth between two positions thereof, comprising:
- a first coil member and a second coil member, said coil members being responsive to separate currents supplied thereto to exert oppositely-directed magnetic forces on an armature;
- a first bistable device having a first electrode and a second electrode and actuatable between a stable high-conduction state exhibited between said first and second electrodes and a stable low-conduction state exhibited between said first and second electrodes;
- a second bistable device having a first electrode and a second electrode and actuatable between a stable high-conduction state exhibited between said first and second electrodes thereof and a stable low-conduction state exhibited between said first and second electrodes thereof;
- a source of direct voltage;
- first means connecting said first coil member, said first and second electrodes of said first device, and said source in a first common series circuit;
- second means connecting said second coil member, said first and second electrodes of said second device, and said source in second common series circuit;
- first capacitive means connected in parallel with a series combination of said first coil member and said first and second electrodes of said first device when said first bistable device is in said high-conduction state thereof;
- second capacitive means connected in parallel with the series combination of said second coil member and said first and second electrodes of said second device when said second bistable device is in said high-conduction state thereof;
- first means for charging said first capacitive means when said first bistable device is in said low-conduction state thereof, whereby when said first bistable device is actuated to said high-conduction state said first capacitive means discharges to produce a pulse of current through said first coil member;
- second means for charging said second capacitive means when said second bistable device is in said low-conduction state thereof, whereby when said second bistable device is actuated to said high-conduction state said second capacitive means discharges to produce a pulse of current through said second coil member;
- the resistance of said first common series circuit when said first bistable device is in said high-conduction state being sufficiently high to produce, after said pulse of current through said first coil member is substantially ended, a current through said coil member which is substantially smaller than the maximum intensity of said last-named current pulse but sufficient to maintain said high-conduction state in said first bistable device;
- the resistance of said second common series circuit when said second bistable device is in said high-conduction state thereof being sufficiently high to produce, after said pulse of current through said second coil member is substantially ended, a current through said second coil member which is substantially smaller than the maximum intensity of said last-named current pulse but sufficient to maintain said high-conduction state in said second bistable device;
- interconnecting capacitive means connecting said first common series circuit to said second common series circuit for actuating said first bistable device from its high-conduction state to its low-conduction state when said second bistable device changes from its low-conduction state to its high-conduction state, and for actuating said second bistable device from its high-conduction state to its low-conduction state when said first bistable device changes from its low-conduction state to its high-conduction state; and
- means for alternatively actuating said first and second bistable devices to their high-conduction states.

6. The circuit of claim 5, in which each of said first and second bistable devices comprises a semi-conductor bistable device.

7. The circuit of claim 5, comprising a first series combination of a diode rectifier and a Zener diode connected in parallel with said first coil member, said diode rectifier and said Zener diode having like elements thereof directly connected together and being so poled as to reverse-bias said diode rectifier in response to the steady-state voltage produced by said source, and a second series combination of a second diode rectifier and a second Zener diode connected in parallel with said second coil member, said second diode rectifier and said second Zener diode having like elements thereof directly connected together and being so poled as to reverse-bias said second rectifier in response to the steady-state voltage produced by said source.

8. The circuit of claim 5, in which said first means for charging said first capacitive means comprises first resistance means connected in said first common series circuit with one terminal thereof connected to said source and the other terminal thereof connected to said one terminal of said first capacitive means, and in which said second means for charging said second capacitive means comprises second resistance means connected in said second common series circuit with one terminal thereof connected to said source and the other terminal thereof connected to one terminal of said second capacitive means.

9. A control circuit suitable for operating an armature back and forth between a first and second position thereof, comprising:
- a first coil member responsive to a current therethrough to exert a magnetic force on an armature;
- a second coil member responsive to a current therethrough to exert a magnetic force on said armature opposite to the direction of said force exerted by said first coil member;
- a first silicon controlled rectifier having an anode electrode, a cathode electrode and a gate electrode;
- a second silicon controlled rectifier having an anode electrode, a cathode electrode and a gate electrode;
- a source of direct voltage;
- a first resistor;
- means connecting said source, said first resistor, said first coil member and said anode and cathode electrodes of said first silicon controlled rectifier in a first common series circuit with each other in the order stated, the polarity of said source being such as to bias said anode electrode of said first silicon controlled rectifier in the forward direction with respect to said cathode electrode thereof;
- a second resistor;
- means connecting said source, said second resistor, said second coil member and said anode and cathode electrodes of said second silicon controlled rectifier in a second common series circuit with each other in the order stated, the polarity of said source being such as to bias said anode electrode of said second silicon controlled rectifier in the forward direction with respect to said cathode electrode thereof;

a first capacitor directly connected in parallel with the series combination of said first coil member and said anode and cathode electrodes of said first silicon controlled rectifier;

a second capacitor directly connected in parallel with the series combination of said second coil member and said anode and cathode electrodes of said second silicon controlled rectifier;

an interconnecting capacitor connected between said anode electrode of said first silicon controlled rectifier and said anode electrode of said second silicon controlled rectifier for momentarily reducing the current through said anode electrode of said first silicon controlled rectifier when said second silicon controlled rectifier is first actuated to its high-conduction state, and for momentarily reducing the current through said anode electrode of said second silicon controlled rectifier when said first silicon controlled rectifier is first actuated to its high-conduction state;

the resistance of said first common series circuit being sufficiently low to maintain said first silicon controlled rectifier in its high-conduction state once actuated thereto, until returned to its low-conduction state in response to actuation of said second silicon controlled rectifier to its high-conduction state;

the resistance of said second common series circuit being sufficiently low to maintain said second silicon controlled rectifier in its high-conduction state once actuated thereto, until returned to its low-conduction state in response to actuation of said first silicon controlled rectifier to its high-conduction state; and means connected to said gate electrodes of said first and second silicon controlled rectifiers to actuate said silicon controlled rectifiers alternately to their respective high conduction states.

10. The circuit of claim 9, comprising a first series combination of a first diode rectifier and a first Zener diode connected in parallel with said first coil member, said first diode rectifier and said first Zener diode having like elements thereof directly connected together and being so poled as to reverse-bias said first rectifier in response to the steady-state voltage produced by said source, and a second series combination of a second diode rectifier and a second Zener diode connected in parallel to said second coil member, said second diode rectifier and said second Zener diode having like elements thereof directly connected together and being so poled as to reverse-bias said second rectifier in response to the steady-state voltage produced by said source.

11. Valve apparatus comprising:
a valve body;
means defining a fluid passage extending through said body;
means defining a valve seat in said passage;
a valve member;
means for movably supporting said valve member adjacent said valve seat;
actuating means associated with said valve member for moving said valve member into and out of closing relationship with respect to said valve seat, said actuating means including an armature connected to said valve member, a first coil adjacent one portion of said armature for moving said armature in a first direction, and a second coil adjacent a second portion of said armature for moving said armature in a second direction opposite said first direction; and circuit means for energizing said coils alternately, said energizing means comprising a source of direct voltage, a first bistable semi-conductor device having control means and a pair of electrodes, said first bistable semi-conductor device being responsive to a momentary control signal applied to said control means to actuate it to its high-conduction state and being responsive to a momentary reduction in the current through said pair of electrodes thereof when in its high-conduction state to be actuated to its low-conduction state, and means connecting said source of direct voltage and said pair of electrodes of said first bistable semi-conductor device in a first common series circuit with said first coil;

means for applying momentary control signals to said control means of said first bistable device to actuate it to its high-conduction state; and means for momentarily reducing the current through said pair of electrodes of said first bistable device when in its high-conduction state to actuate it to its low-conduction state.

12. The apparatus of claim 11, comprising also a first series combination of a first diode rectifier and a first Zener diode connected in parallel with said first coil, said first diode rectifier and said first Zener diode having like elements thereof directly connected together and being so poled as to reverse-bias said first rectifier in response to the steady-state voltage produced by said source.

13. Apparatus in accordance with claim 11, in which said energizing means comprises a second bistable semi-conductor device having second control means and a second pair of electrodes, said second bistable semi-conductor device being responsive to a momentary control signal applied to said control means thereof to actuate said second bistable device to its high-conduction state and being responsive to a momentary reduction in the current through said pair of electrodes thereof when in its high-conduction state to be actuated to its low-conduction state, and means connecting said source of direct voltage and said second pair of electrodes in a second common series circuit with said second coil; and an interconnecting capacitor connected between one of said pair of electrodes of said first bistable device and one of said pair of electrodes of said second bistable device whereby actuation of either of said bistable devices to its high-conduction state causes the other bistable device to revert to its low-conduction state.

14. Apparatus in accordance with claim 13, comprising a first series combination of a first diode rectifier and a first Zener diode connected in parallel with said first coil, said first diode rectifier and said first Zener diode having like elements thereof directly connected together and being so poled as to reverse-bias said first rectifier in response to the steady-state voltage produced by said source, and also comprising a second combination of a second diode rectifier and a second Zener diode connected in parallel with said second coil, said second diode rectifier and said second Zener diode having like elements thereof directly connected together and being so poled as to reverse-bias said second rectifier in response to the steady-state voltage produced by said source, the reverse-polarity voltage generated by each of said coils when its corresponding bistable device is first actuated to its low-conduction state being greater than the breakdown voltage of the Zener diode connected in parallel therewith.

15. Apparatus in accordance with claim 11, in which each of said first and second coils is responsive to current supplied thereto to attract said armature and move it to a corresponding one of its two extreme positions, the arrangement of each of said coils being such that the magnetic force exerted on said armature by a given current in said each coil increases as said armature is moved toward it.

References Cited

UNITED STATES PATENTS

| | | | |
|---|---|---|---|
| 2,619,116 | 11/1952 | Ralston | 251—137 X |
| 2,778,978 | 1/1957 | Drew | 317—149 X |
| 2,901,210 | 8/1959 | Hebard | 251—137 |
| 3,047,742 | 7/1962 | Greening et al. | 317—123 X |
| 3,182,222 | 5/1965 | Lacy et al. | 317—148.5 |
| 3,213,321 | 10/1965 | Dalziel | 317—148.5 |
| 3,213,323 | 10/1965 | Circle | 317—148.5 X |
| 3,247,912 | 4/1966 | Reynolds | 251—129 X |
| 3,295,421 | 1/1967 | McCormick | 317—148.5 X |

M. CARY NELSON, *Primary Examiner.*

R. C. MILLER, *Assistant Examiner.*